US008826814B2

(12) United States Patent  
Ebata et al.

(10) Patent No.: US 8,826,814 B2  
(45) Date of Patent: Sep. 9, 2014

(54) METHOD AND APPARATUS FOR CUTTING FOOD DOUGH

(75) Inventors: Hiroshi Ebata, Utsonomiya (JP); Reo Yamada, Utsunomiya (JP); Akira Todate, Kanuma (JP)

(73) Assignee: Rheon Automatic Machinery Co., Ltd., Tochigi (JP)

( * ) Notice: Subject to any disclaimer, the term of this patent is extended or adjusted under 35 U.S.C. 154(b) by 298 days.

(21) Appl. No.: 12/993,537

(22) PCT Filed: May 21, 2009

(86) PCT No.: PCT/JP2009/059333  
§ 371 (c)(1),  
(2), (4) Date: Jan. 4, 2011

(87) PCT Pub. No.: WO2009/142260  
PCT Pub. Date: Nov. 26, 2009

(65) Prior Publication Data  
US 2011/0111100 A1 May 12, 2011

(30) Foreign Application Priority Data

May 23, 2008 (JP) .................................. 2008-135724  
May 23, 2008 (JP) .................................. 2008-135727

(51) Int. Cl.  
*A23N 4/04* (2006.01)  
*A21C 11/10* (2006.01)  
*A21C 5/00* (2006.01)  
*A21C 3/10* (2006.01)  
*A21C 7/02* (2006.01)  
*A21C 9/08* (2006.01)

(52) U.S. Cl.  
CPC . *A21C 3/10* (2013.01); *A21C 11/10* (2013.01); *A21C 5/00* (2013.01); *A21C 7/02* (2013.01); *A21C 9/08* (2013.01)

USPC ............................................. 99/537; 426/231

(58) Field of Classification Search  
USPC ......... 99/450.1, 489; 426/231, 496, 501, 503, 426/512, 518, 500  
See application file for complete search history.

(56) References Cited

U.S. PATENT DOCUMENTS 2,963,994 A * 12/1960 Britcher .......................... 425/93  
5,112,631 A *  5/1992 Nakamura .................... 426/297

(Continued)

FOREIGN PATENT DOCUMENTS

EP  0 145 351 A2  6/1985  
JP  60-110237 A  6/1985

(Continued)

*Primary Examiner* — Henry Yuen  
*Assistant Examiner* — Phuong Nguyen  
(74) *Attorney, Agent, or Firm* — Greenblum & Bernstein, P.L.C.

(57) ABSTRACT

While the long and large food dough is being transferred to a downstream conveyor (71) provided adjacent to a weighing conveyor (69), the long and the large food dough is cut by a cutting device (73) provided between the weighing conveyor (69) and the downstream conveyor (71) at a timing when a weight of the long and large food dough measured in advance on the weighing conveyor (69) is reduced by a given weight. In this method, with one side portion of the long and large food dough held by a dough holding member (99) provided between the weighing conveyor (69) and the downstream conveyor (71) to be reciprocable in directions to contact and separate from the long and large food dough, the long and large food dough is cut from another side portion of the long and large food dough by a cutting blade (103) provided opposed to this dough holding member (99).

3 Claims, 9 Drawing Sheets

(56) References Cited

U.S. PATENT DOCUMENTS

| | | | |
|---|---|---|---|
| 5,158,792 A | * | 10/1992 | Morikawa et al. ............ 426/231 |
| 5,286,185 A | | 2/1994 | Tashiro et al. |
| 5,292,539 A | * | 3/1994 | Tashiro et al. ................ 426/231 |

FOREIGN PATENT DOCUMENTS

| | | |
|---|---|---|
| JP | 5-56743 A | 3/1993 |
| JP | 5-268864 A | 10/1993 |
| JP | 2558200 B2 | 11/1996 |
| JP | 2733393 B2 | 3/1998 |
| JP | 2003-135 A | 1/2003 |
| JP | 2004-49161 A | 2/2004 |
| JP | 3761848 B2 | 3/2006 |
| JP | 2006-101886 A | 4/2006 |
| JP | 3972047 B2 | 9/2007 |
| JP | 2008-263807 A | 11/2008 |
| WO | 2008/129985 A1 | 10/2008 |

* cited by examiner (a)

(b)

METHOD AND APPARATUS FOR CUTTING FOOD DOUGH

TECHNICAL FIELD

The present invention relates to a method and an apparatus for cutting small food dough having a preset given weight out of relatively long and large food dough, and more specifically to a method and an apparatus for cutting food dough which are capable of measuring and cutting small food dough more accurately.

BACKGROUND ART

Conventionally, in the process of cutting small food dough having a given weight out of relatively long and large food dough, the food is transferred from a conveyor on an upstream side onto a conveyor on a downstream side, a weight of the food dough transferred to the conveyor on the downstream side is detected, and then the food dough is cut when the detected weight reaches the given weight. This technique has been disclosed in Patent Document 1, for example.

The conventional measuring and cutting method is effective when the food dough is continuously placed on the conveyor on the upstream side. However, if dusting flour or the like adheres to the conveyor on the downstream side, for example, then this method has a problem that a weight of the adhering dusting flour or the like may affect a measured value of the food dough.

On the other hand, in a manufacturing method for a sweet bun and the like, food dough (bread dough) divided into an appropriate amount is properly rounded into a ball by using a dough rounding apparatus before sending the dough to a subsequence process such as a leavening process. This technique has been disclosed in Patent Document 2, for example.

A configuration disclosed in the aforementioned Patent Document 2 is a configuration in which a rotating body with a frusto-conical shape is provided inside an outer cylinder with a cylindrical shape to be rotatable in one direction and eccentrically rotatable. Although a rounding action of the bread dough is effectively performed, this configuration requires a motor for rotating the rotating body and another motor for eccentrically rotating the rotating body. Hence this configuration is complicated and expensive, and there has been a demand for a rounding apparatus having a simpler configuration.

PRIOR ART DOCUMENTS

Patent Documents

Patent Document 1: Japanese Patent Application Laid-Open No. 2003-135
Patent Document 2: Japanese Patent No. 3761848

DISCLOSURE OF THE INVENTION

Technical Problem

This invention has been made to solve the above-mentioned problems. Accordingly, an object thereof is to provide a method and an apparatus for cutting food dough which are capable of more accurately measuring and cutting small food dough out of relatively long and large food dough.

In addition, another object of the present invention is to provide a method and an apparatus for effectively punching food dough down and rounding a surface of the dough into a smooth and tight surface.

Technical Solution

In order to achieve the above object, a first aspect of the present invention provides a method of cutting food dough which comprises the steps of: placing long and large food dough on a weighing conveyor; transferring the long and large food dough onto a downstream conveyor provided adjacent to the weighing conveyor; cutting the long and large food dough by use of a cutting device provided between the weighing conveyor and the downstream conveyor at a timing when a weight of the long and large food dough measured in advance on the weighing conveyor is reduced by a given weight while the long and large good dough is being transferred to the downstream conveyor; and cutting small food dough having the given weight out of the long and large food dough by the cutting.

A second aspect of the present invention dependent on the first aspect is as follows: in the above method of cutting food dough, with one side portion of the long and large food dough held by a dough holding member, the long and large food dough is cut from another side portion of the long and large food dough by a cutting blade provided opposite to the dough holding member, the dough holding member provided between the weighing conveyor and the downstream conveyor to be reciprocable in directions to contact and separate from the long and large food dough.

A third aspect of the present invention provides a food dough cutting apparatus configured to cut long and large food dough into small food dough having a preset given weight, comprising: a weighing conveyor configured to be capable of loading thereon the entire long and large food dough and of measuring a total weight of the loaded long and large food dough; a downstream conveyor configured to support the long and large food dough transferred from the weighing conveyor; a cutting device provided between the weighing conveyor and the downstream conveyor; and a control device configured to control an operation of the cutting device so that the long and large food dough is cut when a measured value of the long and large food dough measured by the weighing conveyor is reduced by an amount of a set value for cutting out food dough having the given weight.

A fourth aspect of the present invention dependent on the third aspect is as follows: in the above food dough measuring and cutting apparatus, the cutting device comprises: a dough holding member configured to hold one side portion of the long and large food dough as needed between the weighing conveyor and the downstream conveyor; and a cutting blade opposed to the dough holding member and configured to cut the long and large food dough.

A fifth aspect of the present invention dependent on the third aspect or the fourth aspect provides the above food dough measuring and cutting apparatus, further comprising: a hopper provided in a position above the weighing conveyor and configured to contain food dough; and a cutter device configured to cut food dough supplied from the hopper into the long and large food dough a whole of which is to be loaded on the weighing conveyor.

A sixth aspect of the present invention dependent on any one of the third to fifth aspects provides the above food dough measuring and cutting apparatus, further comprising: a food dough rounding device provided on a lower side of a mount frame supporting the food dough measuring and cutting apparatus and configured to round the cut small food dough with the given weight.

A seventh aspect of the present invention provides a method of rounding food dough which comprises the steps of providing a frusto-conical rotating body having a diameter on an upper side smaller than a diameter on a lower side and being positively and negative rotatable inside any of an external cylinder including a frusto-conical inner peripheral surface having a diameter on an upper side larger than a diameter on a lower side and an external cylinder having a cylindrical inner surface; giving positive rotation and negative rotation to food dough supplied into a V-shaped annular transfer path defined between the inner peripheral surface of the external cylinder and an outer peripheral surface of the rotating body by positively and negatively rotating the rotating body; and rounding the food dough by giving compression and release to the food dough when the food dough passes through a portion of a roll pressing member provided on the inter peripheral surface of the external cylinder as the food dough is transferred from an upstream side to a downstream side of the transfer path while repeating positive rotation and the negative rotation of the food dough.

An eighth aspect of the present invention provides a method of rounding food dough which comprises the steps of: providing a frusto-conical or cylindrical rotating body having a diameter on an upper side smaller than a diameter on a lower side and being positively and negative rotatable inside an external cylinder including a frusto-conical inner peripheral surface having a diameter on an upper side larger than a diameter on a lower side; giving positive rotation and negative rotation to food dough supplied into a V-shaped annular transfer path defined between the inner peripheral surface of the external cylinder and an outer peripheral surface of the rotating body by positively and negatively rotating the rotating body; and rounding the food dough by giving compression and release to the food dough when the food dough passes through a portion of a roll pressing member provided on the inter peripheral surface of the external cylinder as the food dough is transferred from an upstream side to a downstream side of the transfer path while repeating positive rotation and the negative rotation of the food dough.

A ninth aspect of the present invention provides a rounding apparatus configured to round food dough, which comprises: an external cylinder including a frusto-conical or cylindrical inner peripheral surface having a diameter on an upper side larger than a diameter on a lower side and a cylindrical inner surface; a rotating body formed into a frusto-conical shape having a diameter on an upper side smaller than a diameter on a lower side and provided inside the external body so as to be positively and negative rotatable; rotating means for positively and negative rotating the rotating body; and a roll pressing member configured to give compression and release to food dough being supplied into a V-shaped annular transfer path defined between the inner peripheral surface of the external cylinder and an outer peripheral surface of the rotating body and being transferred from an upstream side to a downstream side inside the transfer path.

A tenth aspect of the present invention provides a rounding apparatus configured to round food dough, which comprises: an external cylinder including a frusto-conical inner peripheral surface having a diameter on an upper side larger than a diameter on a lower side and a cylindrical inner surface; a rotating body formed into a frusto-conical or cylindrical shape having a diameter on an upper side smaller than a diameter on a lower side and provided inside the external body so as to be positively and negative rotatable; rotating means for positively and negatively rotating the rotating body; and a roll pressing member configured to give compression and release to food dough being supplied into a V-shaped annular transfer path defined between the inner peripheral surface of the external cylinder and an outer peripheral surface of the rotating body and being transferred from an upstream side to a downstream side inside the transfer path.

An eleventh aspect of the present invention provides the rounding apparatus for food dough according to the ninth aspect or the tenth aspect, in which the external cylinder is provided on a sliding member insertable and removable to and from a mount frame of the rounding apparatus for food dough, the rotating body is provided inside this external cylinder, and rotating means provided on the mount frame for positively and negatively rotating the rotating body and a rotating shaft provided on the rotating body are joinable and disjoinable.

A twelfth aspect of the present invention provides the rounding apparatus for food dough according to the eleventh aspect, in which the sliding member comprises a discharge conveyor configured to discharge the food dough after rounding, and junction between a driving rotating body of conveyor rotating means provided on the mount frame for rotating this discharge conveyor and a driven rotating body provided on the discharge conveyor, or junction between rotating shafts of the rotating means and the rotating means is magnetically joinable.

A thirteenth aspect of the present invention provides the rounding apparatus for food dough according to any one of the ninth to twelfth aspects, in which a measuring and cutting apparatus is provided in a position above the rotating body and configured to measure and cut the food dough to be supplied to the transfer path.

A fourteenth aspect of the present invention provides the rounding apparatus for food dough according to the thirteenth aspect, in which a supply shutter is provided vertically invertible and configured to temporarily receive the food dough cut out by the measuring and cutting apparatus and to supply the food dough to the transfer path.

ADVANTAGEOUS EFFECTS

According to the present invention described from the first aspect to the sixth aspect, a total weight of long and large food dough placed on a weighing conveyor on an upstream side is measured and a weight of the food dough transferred onto a conveyor on a downstream side is obtained by a decrease in a measured weight at the weighing conveyor when the food dough is transferred from this weighing conveyor onto the conveyor on the downstream side. Therefore, even when dusting flour, for example, adheres to the weighing conveyor or the conveyor on the downstream side, it is possible to obtain the weight of the food dough transferred onto the conveyor on the downstream side precisely and thereby to perform measurement and cutting more accurately.

Meanwhile, according to the present invention described from the seventh aspect to the fourteenth aspect, it is possible to simplify a configuration of a rounding apparatus for food dough. Moreover, it is possible to punch the food dough down effectively when rounding the food dough and to round a surface of the food dough into a smooth and tight surface.

BRIEF DESCRIPTION OF THE DRAWINGS

FIG. 1 is a front sectional explanatory view showing a section of part of a rounding apparatus for food dough

FIG. 2 is a right side sectional explanatory view showing a section of part of a rounding apparatus for food dough having a system configuration in which the rounding apparatus for food dough is combined with a measuring and cutting apparatus for food dough.

FIG. 3 is a left side sectional explanatory view showing a section of part of a rounding apparatus for food dough having a system configuration in which the rounding apparatus for food dough is combined with a measuring and cutting apparatus for food dough.

FIG. 4 is a plan explanatory view showing principal part of the rounding apparatus for food dough.

FIGS. 5(a) to 5(d) are explanatory views respectively for Va-Va, Vb-Vb, Vc-Vc, and Vd-Vd cross sections in FIG. 4.

FIG. 6 is an explanatory view showing a state of food dough in a transfer path.

FIG. 7(a) and FIG. 7(b) are explanatory views for presence or absence of twist of the food dough.

FIG. 8 is a front explanatory view in a state of opening a cover upward and taking out a hopper, a cutter housing, and the like, part of which is sectioned.

FIG. 9 is a left side view of the above drawing and an explanatory view in a state of pulling a sliding member forward, part of which is omitted and part of which is sectioned.

FIG. 10 is a side explanatory view showing the state of pulling the sliding member forward.

BEST MODES FOR CARRYING OUT THE INVENTION

The present invention relates to a method and an apparatus for cutting small food dough having a preset given weight out of relatively long and large food dough, and more specifically to a method and an apparatus for cutting food dough which are capable of measuring and cutting small food dough more accurately.

Furthermore, the present invention relates to a method and an apparatus for rounding food dough such as pastry dough, and more specifically to a method and an apparatus for effectively punching food dough down and rounding a surface of the dough into a smooth and tight surface.

Hereinbelow, an embodiment of the present invention will be described by using the drawings. Here, a food dough measuring and cutting apparatus according to this embodiment may be used as a configuration including only the food dough measuring and cutting apparatus. However, it is possible to have a system configuration in which a food dough rounding device for rounding food dough measured and cut into a given weight is combined with the food dough measuring and cutting apparatus. Therefore, the system configuration will be described below.

Figure 1:
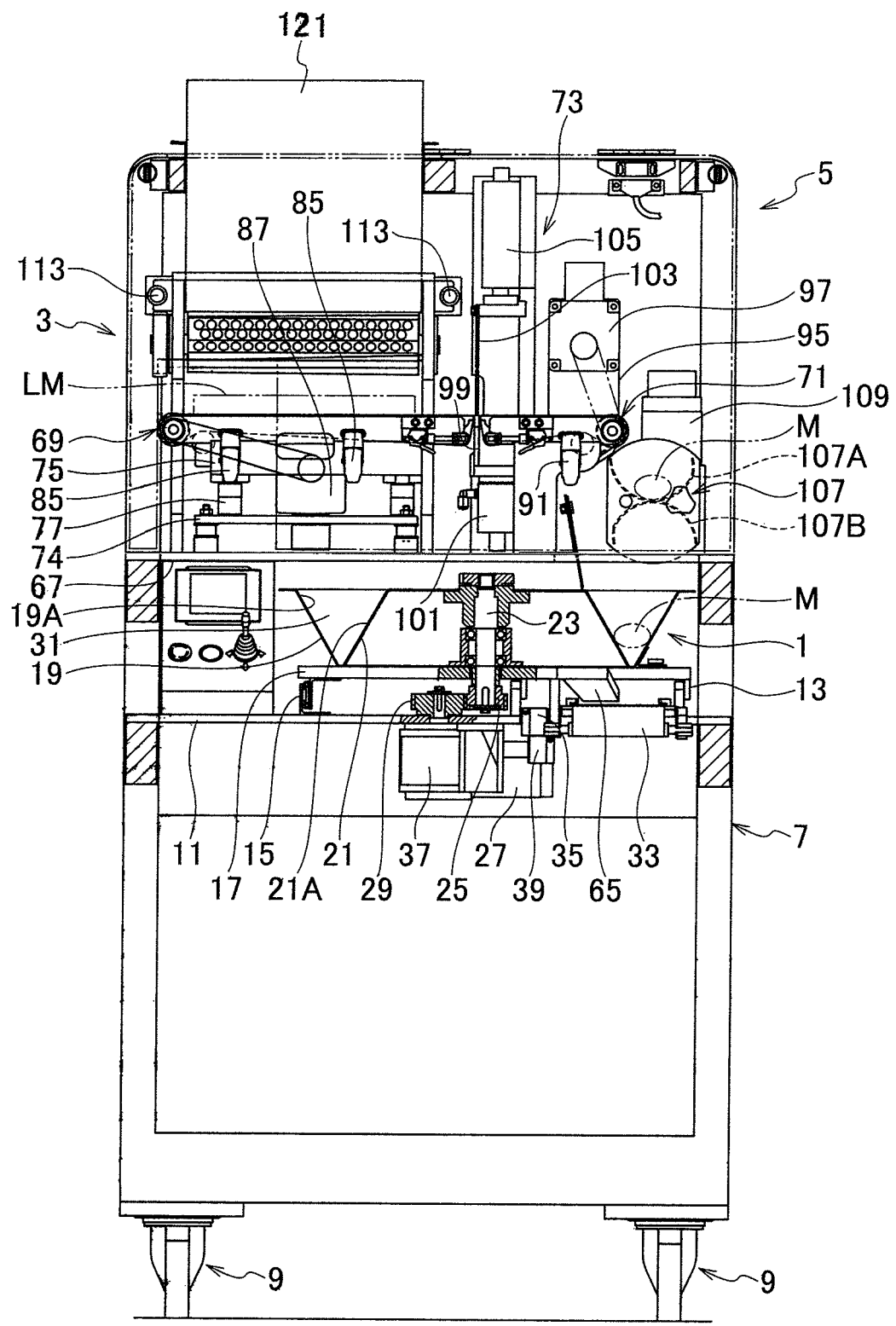
[FIG. 1]

Referring to FIG. 1, a food dough cutting and rounding apparatus 5 having a system configuration, in which a food dough rounding apparatus 1 for rounding food dough M having a given size is combined with a food dough measuring and cutting apparatus 3 for measuring (weighing) and cutting relatively long and large food dough LM into the food dough M having a given weight, includes a mount frame 7 common to the food dough rounding device 1 and to the food dough measuring and cutting apparatus 3. The mount frame 7 is configured to have a frame body structure including multiple casters 9 for moving the mount frame 7. Moreover, the food dough measuring and cutting apparatus 3 is disposed in a position above the food dough rounding device 1 supported by the mount frame 7.

Figure 2:
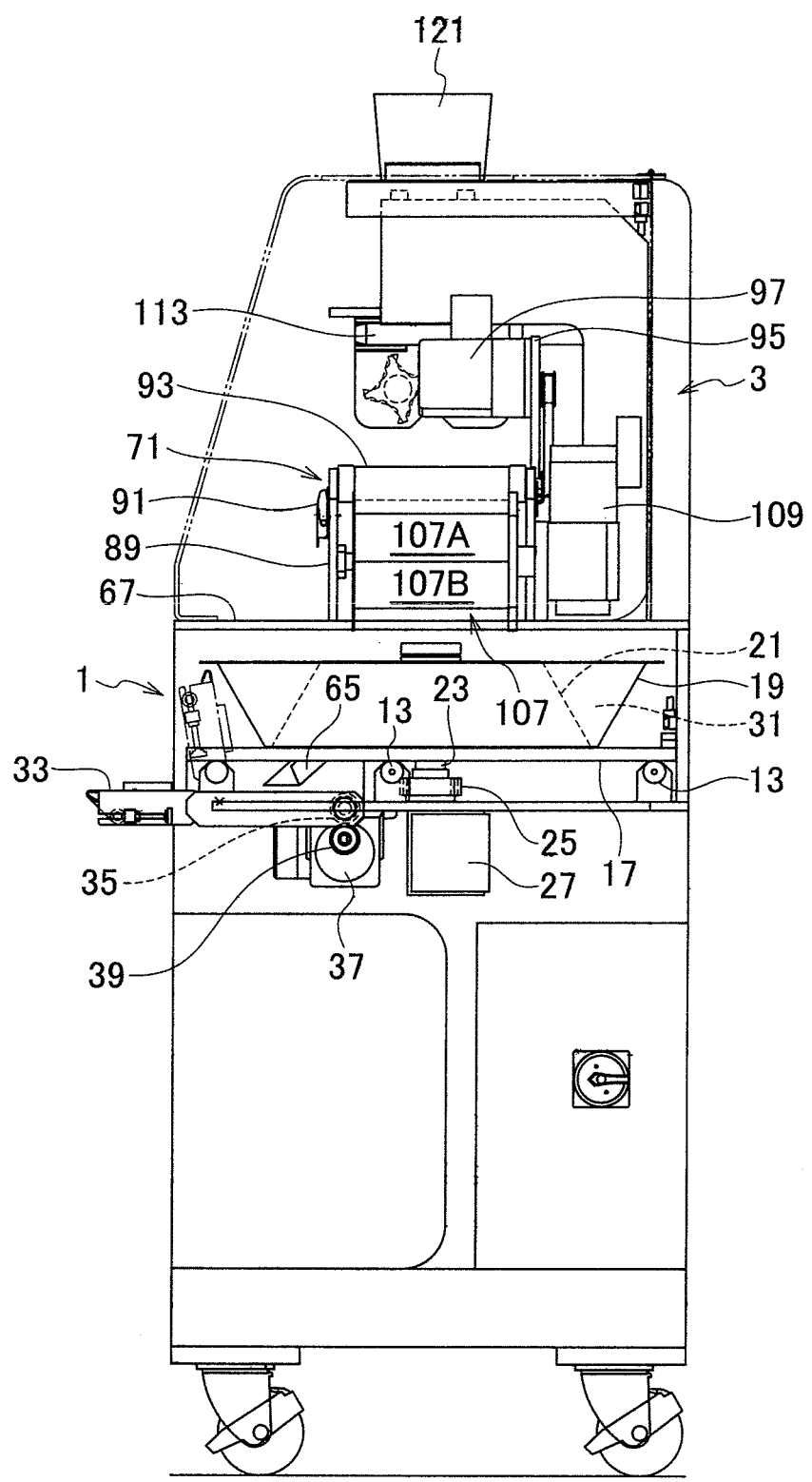
[FIG. 2]
Figure 3:
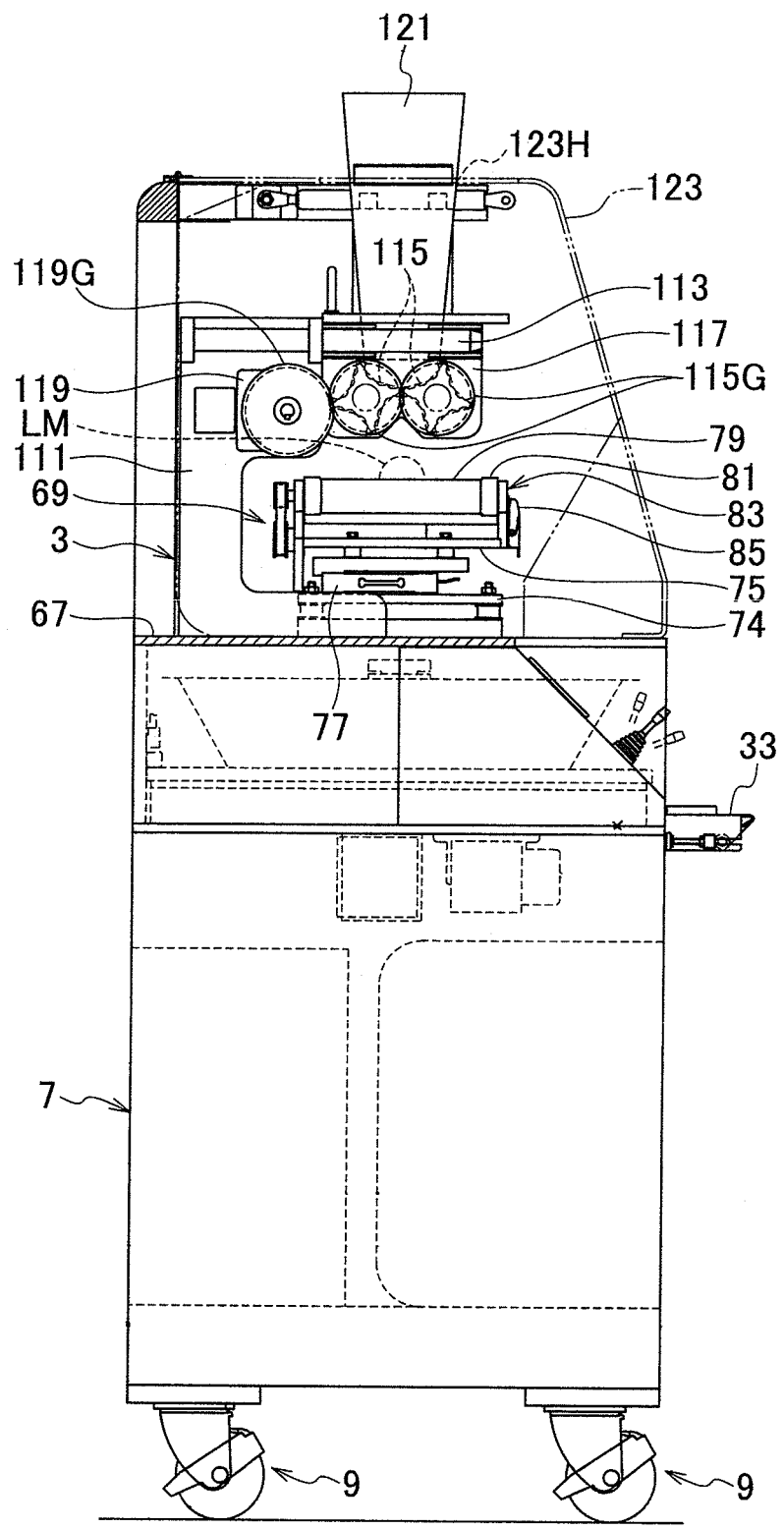
[FIG. 3]

The food dough rounding device 1 is provided on a base plate 11 provided in an intermediate height position of the mount frame 7 so as to be capable of being drawn forward of the food dough cutting and rounding apparatus 5 (toward a surface side perpendicular to a sheet surface in FIG. 1, toward a left side in FIG. 2, or toward a right side in FIG. 3).

To be more precise, the food dough rolling apparatus 1 includes a sliding member (a sliding plate) 17 of a plate shape which is supported and guided so as to be movable in a front-rear direction by a supporting member 13 (see FIG. 2) such as multiple supporting rollers provided on the base plate 11 and by a guiding member 15 provided on the base plate 11 and elongated in the front-rear direction (a direction perpendicular to the sheet surface in FIG. 1 or a right-left direction in FIG. 2). Moreover, an external cylinder 19 provided with an inner peripheral surface 19A that is formed into a frustoconical shape having a diameter on an upper side larger than a diameter on a lower side is integrally provided on the sliding member 17, and a rotating body 21 formed into a frustoconical shape having a diameter on an upper side smaller than a diameter on a lower side is provided inside this outer cylinder 19 so as to be capable of rotating positively and negatively.

Figure 9:
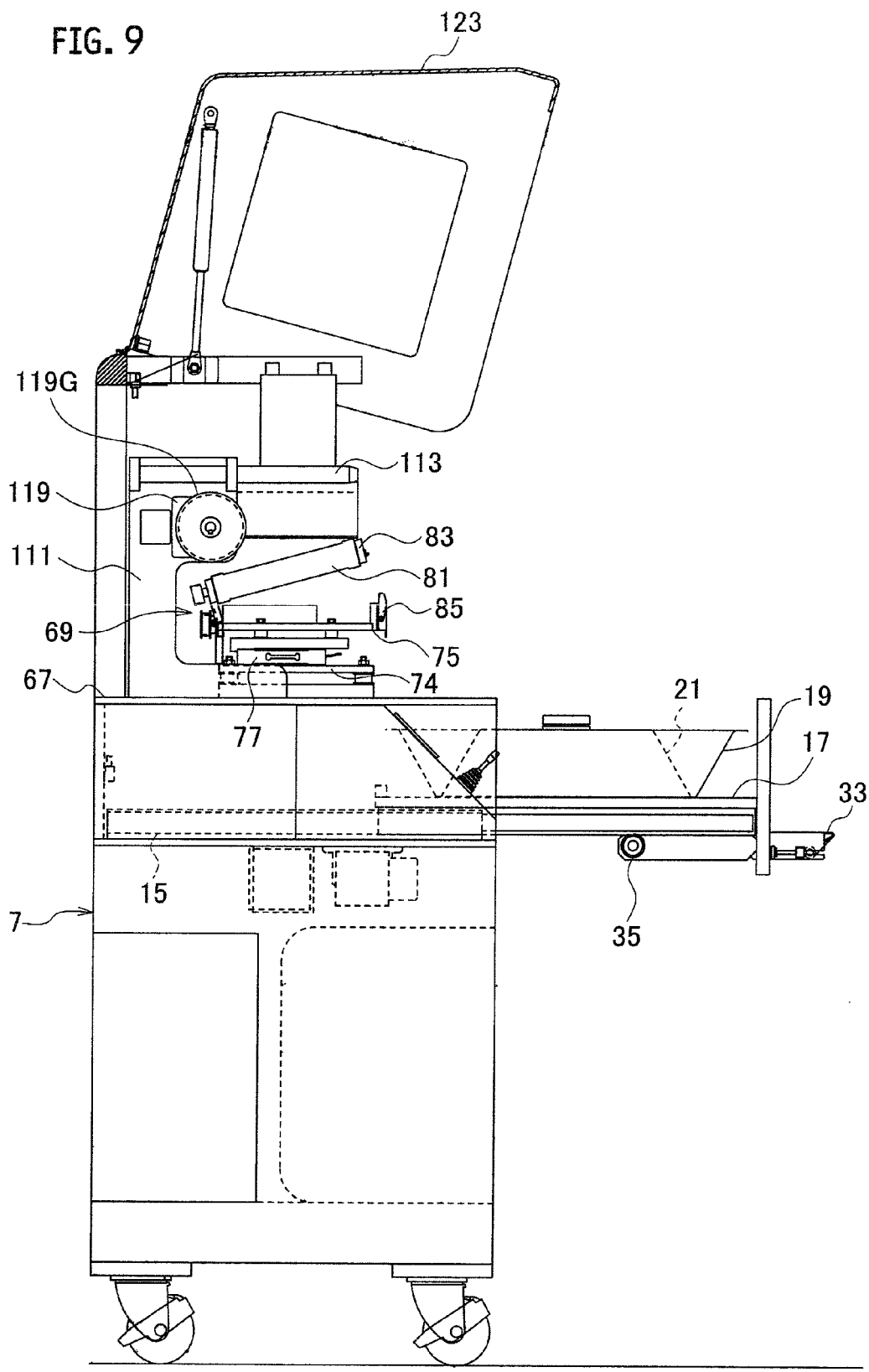
[FIG. 9]
Figure 10:
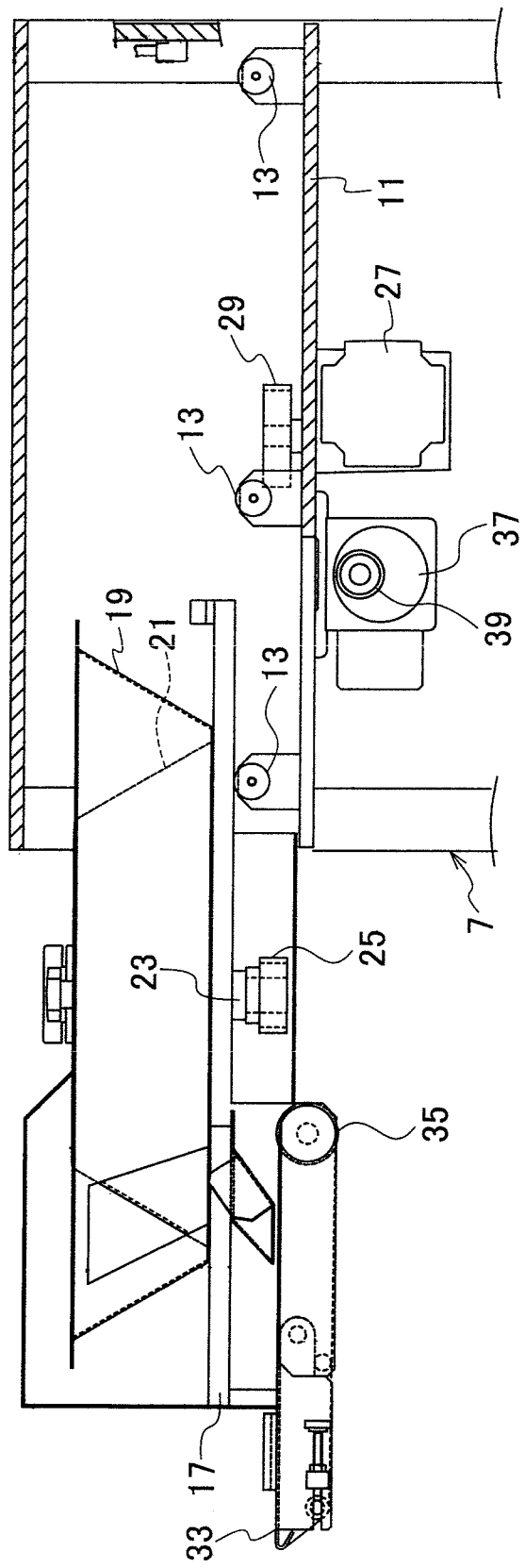
[FIG. 10]

Therefore, by drawing the sliding member 17 forward, it is possible to draw the external cylinder 19 and the like fitted to the sliding member 17 forward of the food dough cutting and rounding apparatus 5 (toward a right side in FIG. 9 or toward a left side in FIG. 10) as shown in FIG. 9 and FIG. 10.

The rotating body 21 is detachably fitted to a rotating shaft 23 which is perpendicularly and rotatably supported by the sliding member 17 in a central position of the external cylinder 19. Moreover, a driven gear 25 provided at a lower end portion of this rotating shaft 23 is horizontally engageable with and detachable from a driving gear 29 provided on a rotating motor 27 serving as rotating means attached to a lower surface of the base plate 11. A V-shaped annular transfer path 31 is defined between the inner peripheral surface 19A of the external cylinder 19 and an outer peripheral surface 21A of the rotating body 21.

In the food dough rounding device 1 having the above-described configuration, the rotating body 21 repeats positive rotation (rotation in a direction of an arrow A in FIG. 4) and negative rotation by positive and negative rotation of the rotating motor 27. The positive rotation and the negative rotation gives, to the food dough M supplied into the transfer path 31, self rotation of the positive and negative rotation (a direction of an arrow B indicates the self rotation of the positive rotation) and orbital motion of the positive and negative rotation (a direction of an arrow C indicates the orbital motion of the positive rotation). In this way, the food dough M is rounded. Then, the food dough M rolled inside the transfer path 31 and subjected to rounding is taken out from an outlet 41 (not shown in FIGS. 1 and 2) formed on the external cylinder 19 and is conveyed to a subsequent process by use of a discharge conveyor 33 provided on the sliding member 17 so as to correspond to this outlet 41.

Here, the positive rotation or the negative rotation of the rotating motor 27 is controlled by a control device (not shown) for controlling actions of the food dough rounding device 1. Although rotating speeds at the time of positive rotation and the negative rotation may be the same or different, a positive rotation time period and a negative rotation time period are preset such that a rolling movement distance of the food dough M at the time of the negative rotation of the rotating body 21 becomes shorter than a rolling movement distance of the food dough M at the time of the position rotation of the rotating body 21. In other words, the distance of the food dough M being rolled and moving from the upstream side to the downstream side inside the transfer path 31 by the positive rotation of the rotating body 21 is a longer distance than the distance of the food dough M retuning by the negative rotation. Therefore, the food dough M is supposed to move from the upstream side to the downstream side while repeating the positive rotation and the negative rotation, i.e., advance and retreat.

Accordingly, the food dough M inside the transfer path 31 is rolled and moves from the upstream side to the downstream side gradually (in the direction of the arrow C in FIG. 4) by receiving a rounding action while repeating the self rotation and the orbital motion of the positive and negative rotation, and is then taken out of the outlet 41 onto discharge conveyor 33.

The discharge conveyor 33 is made of a belt conveyor and is supported on the lower surface of the sliding member 17 via a bracket. Then, a rotating shaft (not shown) for rotating the belt conveyor in this discharge conveyor 33 is provided with a magnet roller 35 serving as a driven rotating body. To rotate the discharge conveyor 33, a conveyance motor 37 serving as conveyor rotating means is disposed on the lower surface of the base plate 11, and a magnet roller 39 serving as a driving rotating body provided on this conveyance motor 37 is magnetically joinable to the magnet roller 35. The magnet rollers 35 and 39 are configured to arrange n poles and s poles of magnets alternately in a circumferential direction, and have a function to transmit rotation of the driving rotating body (the magnet roller 39) to the driven rotating body (the magnet roller 35) in a non-contact state.

Due to the above-described configuration, when the sliding member 17 is drawn forward (toward the left side in FIG. 2 and FIG. 10), the driven gear 25 provided on the rotating shaft 23 of the rotating body 21 is detached in the horizontal direction from the driving gear 29 provided on the rotating motor 27. Thus, the magnet roller 35 of the discharge conveyor 33 separates in the horizontal direction from the magnet roller 39 provided on the conveyance motor 37. Thereafter, when the sliding member 17 is put back to the original position, the driven gear 25 is engaged with the driving gear 29 and the magnet roller 35 of the discharge conveyor 33 approaches and is magnetically joined to the magnet roller 39 of the conveyance motor 37 so that the rotation of the conveyance motor 37 can be transmitted to the discharge conveyor 33.

As already understood, the driving gear 29 provided on the rotating motor 27 and the driven gear 25 provided on the rotating shaft 23 of the rotating body 21 are joined through gear engagement. On the other hand, the conveyance motor 37 and the discharge conveyor 33 are magnetically joined by utilizing the magnet rollers. Accordingly, when the joining operations are performed at one time in both of the different rotation transmission mechanisms, the joining can be smoothly performed without causing problems such as a scoring phenomenon. Moreover, as described previously, the food dough rounding device 1 can be drawn forward of the mount frame 7. Accordingly, cleaning and maintenance check of the food dough rounding device 1 can be performed easily.

In the above description, there is explained a case where the magnet rollers 39 and 35 are configured to be used to transmit the rotation from the conveyance motor 37 to the discharge conveyor 33. However, it is also possible to apply a configuration in which the driving gear 29 of the rotating motor 27 and the driven gear 25 provided on the rotating shaft 23 of the rotating body 21 are replaced respectively with magnet rollers, and thus the rotation of the rotating motor 27 is transmitted to the rotating body 21 via the magnet rollers. Specifically, it is also possible to use the magnet rollers for both the configuration in which the rotation of the motor is transmitted to the rotating body 21 and the configuration in which the rotation is transmitted to the discharge conveyor 33, respectively, whereby at least one or both of the rotation transmission configurations may be changed into a magnetic connection configuration.

Figure 5:
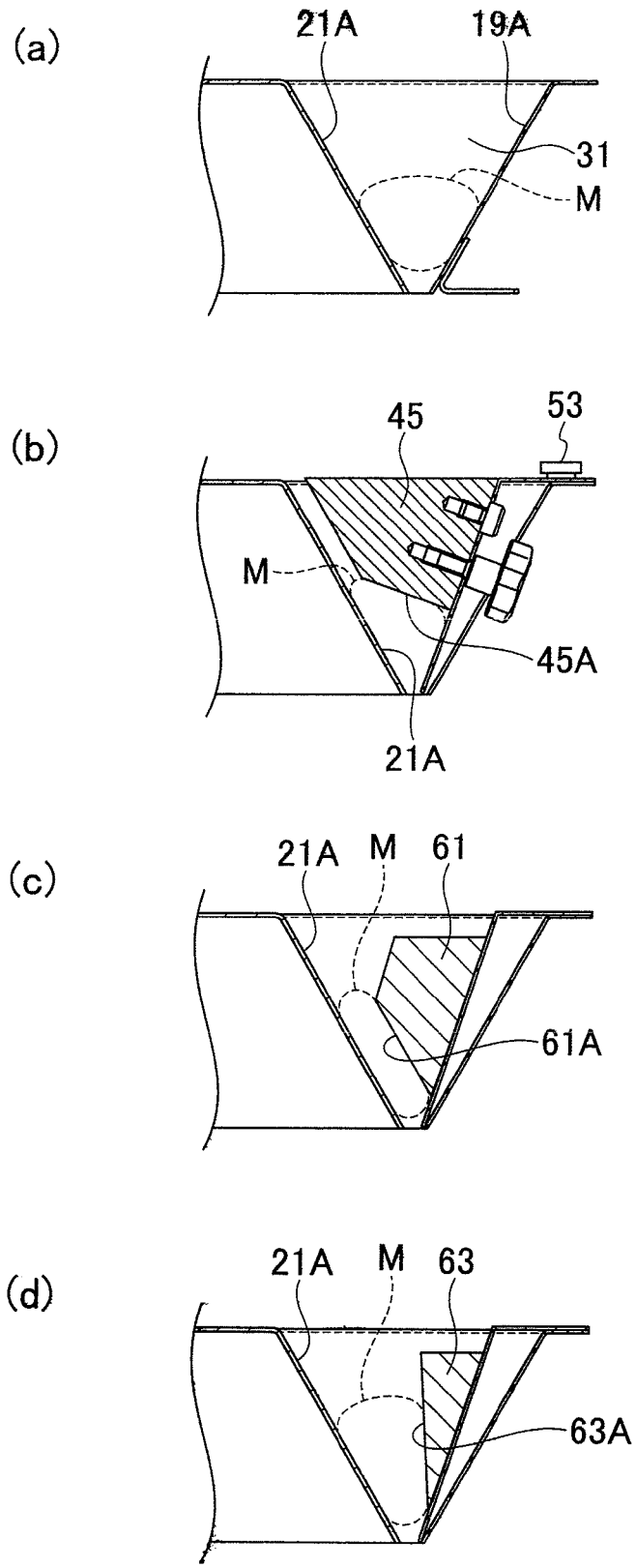
[FIG. 5]
Figure 6:
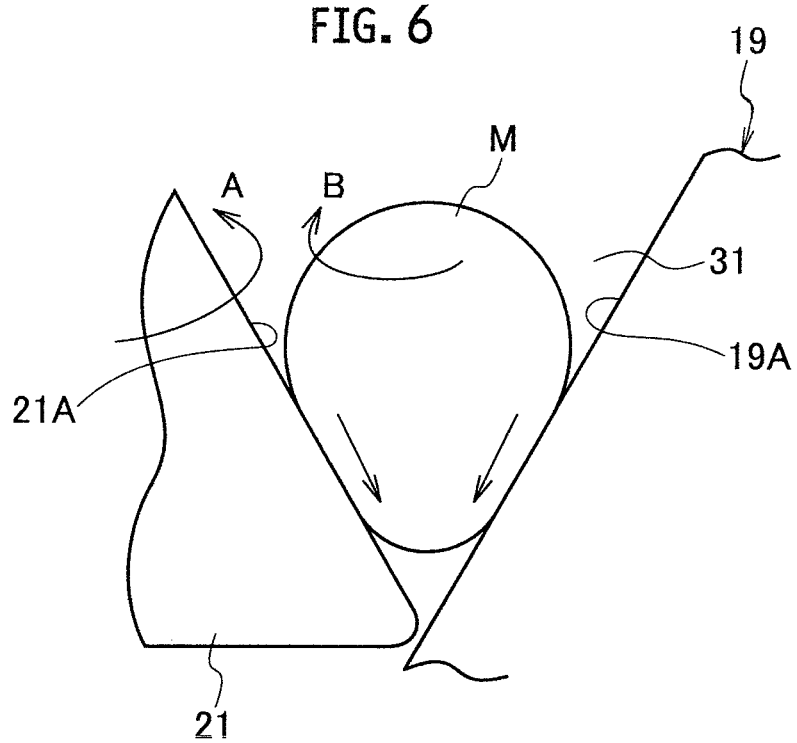
[FIG. 6]

Regarding the V-shaped transfer path 31 defined between the inner peripheral surface 19A of the external cylinder 19 and the outer peripheral surface 21A of the rotating body 21 in the food dough rounding device 1, when viewing a vertical cross section of the transfer path 31, a direction of inclination of the inner peripheral surface 19A toward a vertical plane is opposite to a direction of inclination of the outer peripheral surface 21A as shown in FIG. 1 and FIG. 5(a). However, an absolute value of an angle of inclination of the inner peripheral surface 19A toward the vertical plane is set substantially equal to an absolute value of an angle of inclination of the outer peripheral surface 21A. Therefore, when the food dough M is spherical, this food dough M contacts the inner peripheral surface 19A of the external cylinder 19 and the outer peripheral surface 21A of the rotating body 21 in the same height position. Hence axes of self rotation and orbital motion of the food dough M become vertical.

Figure 4:
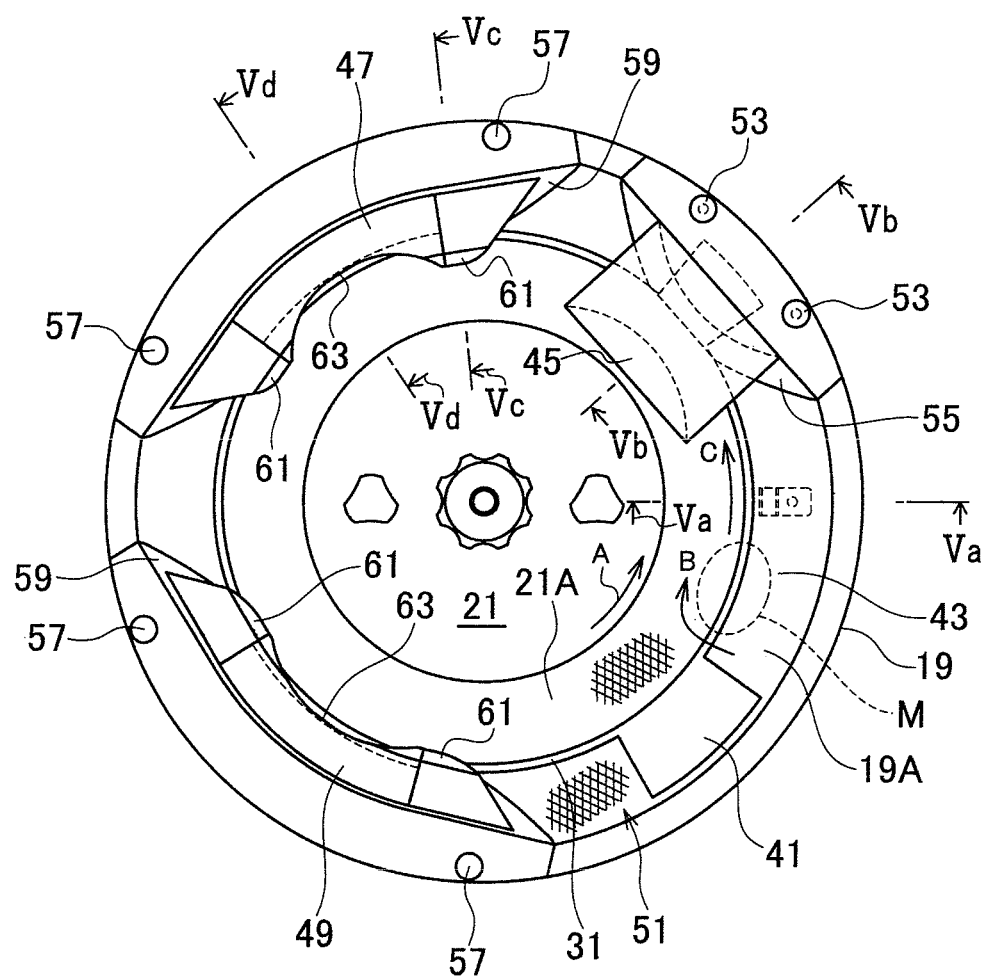
[FIG. 4]

As shown in FIG. 4, the outlet 41 is formed on the external cylinder 19 so as to correspond to a predetermined position of the transfer path 31. When viewed in the direction of positive rotation (in the direction of the arrow A in FIG. 4) of the rotating body 21, a position slightly on a downstream side of the outlet 41 is set as a supply receiving portion 43 configured to receive supply of the food dough M. A first roll pressing member 45 for pressing (rolling) the food dough M, which moves to the downstream side along the transfer path 31, toward a bottom side of the transfer path 31 is provided on the downstream side of this supply receiving portion 43.

The food dough M before reaching a portion of the first roll pressing member 45 repeats self rotation of the positive and negative rotation around the vertical rotating axis due to the positive and negative rotation of the rotating body 21. Then, when reaching the position of the first roll pressing member 45, the food dough M is guided by a lower surface 45A (see FIG. 5(b)) of the first roll pressing member 45 and is pressed toward the bottom of the transfer path 31. In this case, since an upper side of the food dough M contacts the lower surface 45A, the positive and negative rotation in the horizontal direction (which is not always exactly horizontal) around the rotating axis is given to the food dough M.

Specifically, in the position of the first roll pressing member 45, the positive and negative rotation around the vertical rotating axis as well as the positive and negative rotation in the horizontal direction around the rotating axis is given to the food dough M and the food dough M is rotated positively and negatively in the combined directions. Accordingly, it is possible to roll (press, compress) the food dough M effectively as the food dough M passes through the first roll pressing member 45.

Moreover, a second roll pressing member 47 for tightening a surface of the food dough M is provided, on the downstream side, in a position appropriately located away from this first roll pressing member 45. In addition, a third roll pressing member 49 is provided, on the downstream side, in a position appropriately located away from the second roll pressing member 47. A leveling work area 51 for adjusting the shape of the food dough M is provided between this third roll pressing member 49 and the outlet 41.

The first roll pressing member 45 is configured to perform the action to press and compress the food dough M being rolled and moving from the supply receiving portion 43 inside the transfer path 31 toward the bottom of the V-shaped transfer path 31 and is fitted to a bracket 55 that is detachably fitted to the inner peripheral surface 19A of the external cylinder 19 by use of appropriate fixtures 53 such as bolts. Moreover, in order to guide the food dough M being rolled and moving inside the transfer path 31 toward the bottom of the transfer path 31, the lower surface 45A (see FIG. 5(b)) of the first roll pressing member 45 is formed as follows: in a direction along the transfer path 31, the first roll pressing member 45 is formed to have a protruding curved surface or a protruding surface gradually inclined downward from the upstream side of the transfer path 31 toward a central portion of the first roll pressing member 45 so that the central portion becomes the bottom, and in the area from the central portion to the downstream side, the first roll pressing member 45 is formed to have a curved surface or an inclined surface gradually inclined upward toward the downstream side.

In other words, the lower surface 45A of the first roll pressing member 45 is formed as a pressing surface protruding downward so as to gradually press and compress the food dough M moving to the downstream side along the transfer path 31 gradually toward the bottom of the transfer path 31 and then to gradually release the compression of the food dough M. Therefore, the food dough M which undergoes self rotation and the orbital motion of the positive and negative rotation by way of the positive and negative rotation of the rotating body 21, then moves gradually from the supply receiving portion 43 to the downstream side while repeating the advance and retreat, and the passes through the portion of the first roll pressing member 45, is subjected to pressing and compression toward the bottom of the transfer path 31 along the lower surface 45A of the first roll pressing member 45 so as to punch the dough down and then to release of the pressing and compression repeatedly for several times. Accordingly, initial punch-down of the dough is effectively performed as the food dough M passes through the portion of the first roll pressing member 45.

Specifically, the food dough M passing through the first roll pressing member 45 is subjected to the positive and negative rotation around the vertical rotating axis as well as the positive and negative rotation in the horizontal direction around the rotating axis, whereby the food dough M undergoes repetition of the pressing and compression and then release. Hence it is possible to homogenize the condition of the entire food dough M and thereby to achieve stabilization in quality of the food dough M.

The food dough M, which is subjected to stabilization in quality after passing through the position of the first roll pressing member 45 and undergoing the initial punch-down action and the like, is rolled while being alternately subjected to a compressing action and a compression releasing action by the second and third roll pressing members 47 and 49 as the food dough M passes through the positions of the second and third roll pressing members 47 and 49. In this way, the food dough M undergoes a kneading action.

The second roll pressing member 47 and the third roll pressing member 49 have a similar configuration. Accordingly, the configuration of the second roll pressing member 47 will be described in detail, while constituents of the third roll pressing member 49 having the same functions as those of the second roll pressing member 47 will be designated by the same reference numerals and detailed description thereof will be omitted herein.

The second roll pressing member 47 is fitted to a bracket 59 that is detachably fitted to the inner peripheral surface 19A of the external cylinder 19 by use of fixtures 57. In order to press and compress the food dough M moving inside the transfer path 31 toward the outer peripheral surface 21A of the rotating body 21, pressing protrusions 61 each protruding toward the rotating body 21 and each having a pressing protruding surface 61A near the outer peripheral surface 21A of the rotating body 21 as shown in FIG. 5(c) are provided on both end sides on the upstream side and the downstream side in the direction along the transfer path 31 as shown in FIG. 4. Moreover, a compression releasing concave portion 63 having a compression releasing surface 63A (see FIG. 5(d)) provided considerably away from the outer peripheral surface 21A of the rotating body 21 as compared to the pressing protruding surface 61A is provided between the pressing protruding portions 61 on their both sides in order to release the pressing and compression of the food dough M toward the outer peripheral surface 21A of the rotating body 21.

Therefore, the food dough M being subjected to the self rotation and the orbital motion of the positive and negative rotation by way of the positive and negative rotation of the rotating body 21 and being gradually rolled and moving to the downstream side while advancing and retreating along the transfer path 31 passes through the pressing protrusions 61 and the compression releasing concave portion 63 of the first and second roll pressing members 47 and 49 while repeating the advance (the positive rotation) and the retreat (the negative rotation), and thereby being subjected to the compressing action and the releasing action alternately. Then, the food dough M undergoes a kneading action as the food dough M is rolled while being subjected to the compressing action and the releasing action. Hence the food dough M is effectively punched down by kneading.

Incidentally, the transfer path 31 used for rolling and moving the food dough M is formed into the V-shaped groove and the food dough M rotates inside this transfer path 31 in the form of the V-shaped groove. As a consequence, the food dough M is formed into a round shape having a large diameter on an upper side and a small diameter on a lower side, i.e., formed substantially into an ovoid shape. In this case, there is a difference in a circumferential speed between the upper end side and the lower end side of the food dough M due to the difference in the diameter.

Meanwhile, since the lower side of the outer peripheral surface 21A of the rotating body 21 for giving rotation to the food dough M has a higher circumferential speed, the surface of the food dough M tends to be pulled from a slower side to a faster side in terms of the circumferential speed on the outer peripheral surface 21A. Moreover, the own weight of the food dough M also acts on the food dough M. Accordingly, the food dough M tends to receive a guiding action so as to break into the V-shaped groove of the transfer path 31. Therefore, the surface on the upper side of the food dough M is subjected to an action to be pulled outward and is thereby rounded into the tight surface.

Figure 7:
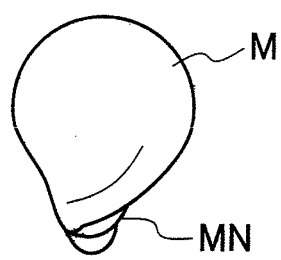
[FIG. 7]
Figure 7:
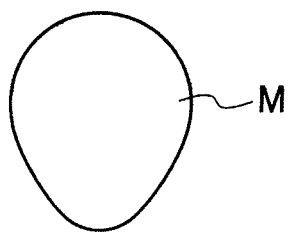

As described above, it is possible to round the food dough M supplied into the transfer path 31 in the form of the V-shaped groove by positively rotating the rotating body 21. However, if the rotating body 21 is rotated only in one direction of the positive rotation, the food dough M tends to form a twisted portion MN as shown in FIG. 7(a) due to the difference in the circumferential speed between the upper side and the lower side of the food dough M. In this embodiment, however, as described above, the food dough M is rolled and moved by repeating the positive rotation and the negative rotation of the rotating body 21. Accordingly, the twist on the twisted portion MN is eliminated at the time of the negative rotation of the rotating body 21. Therefore, as shown in FIG. 7(b), the rounding action can be performed without generating the twisted portion MN on the food dough M. Specifically, damage to the food dough M caused by application of excessive loads thereto can be reduced, and internal stresses of the food dough M can also be reduced at the same time.

The food dough M subjected to the rounding action by passing through the positions of the first and second roll pressing members 47 and 49 undergoes shape adjustment in the leveling work area 51 located on the upstream side of the outlet 41. Specifically, the food dough M is rolled in the leveling work area 51 so as to transfer surface conditions of the inner peripheral surface 19A of the external cylinder 19 and the outer peripheral surface 21A of the rotating body 21. Since the inner peripheral surface 19A of the external cylinder 19 and the outer peripheral surface 21A of the rotating body 21 in the leveling work area 51 are formed smoothly, the surface of the food dough M subjected to the rounding action is formed into a smooth and tight condition. Moreover, an external shape thereof is formed and adjusted to a favorable condition without twisted portions or wrinkles as shown in FIG. 7(b).

Thereafter, the food dough moves to the outlet 41, slides down or rolls down on a chute 65 which is provided on the sliding member 17 so as to correspond to the outlet 41 (see FIGS. 1 and 2), and is placed on the discharge conveyor 33. Then, the rounded food dough M is conveyed to a subsequent process by this discharge conveyor 33.

As it is understood from the above description, both of the inner peripheral surface 19A of the external cylinder 19 and the outer peripheral surface 21A of the rotating body 21 are formed into frusto-conical shapes, which are relatively simple configurations and are easily manufactured. Moreover, the food dough M is compressed and released for rounding by detachably fitting the roll pressing members 45, 47, and 49 having appropriate shapes to the inner peripheral surface 19A of the external cylinder 19. Thus, it is possible to perform compression and release of the food dough M while detaching and replacing the roll pressing members 45, 47, and 49.

Therefore, conditions such as a temporal or distance condition for compression or release and a compression rate can be changed even when the same conditions for the positive rotation and the negative rotation of the rotating body 21 are retained. Hence a change in the size or the condition of the food shape M can be easily addressed without deteriorating productivity.

Moreover, since the rotating body 21 is configured to repeat the positive rotation and the negative rotation, the food dough M undergoes the compressing actions and the compression releasing actions repeatedly in a short compartment. Hence the transfer path 31 for rolling and moving the food dough M can be made short in length and thereby the entire configuration can be made small in size.

Incidentally, the above description has explained and exemplified the case of forming the inner peripheral surface 19A of the external cylinder 19 into the frusto-conical shape having the larger diameter on the upper side while forming the outer peripheral surface 21A of the rotating body 21 into the frusto-conical shape having the larger diameter on the lower side. However, as a modified example, it is also possible to form one of the inner peripheral surface 19A of the external cylinder 19 and the outer peripheral surface 21A of the rotating body 21 into the frusto-conical shape while forming the other one into a circular peripheral surface. This configuration can also exert a similar effect.

The food dough measuring and cutting apparatus 3 is disposed on a base plate 67, which is provided on the mount frame 7 in a position above the food dough rounding device 1. To be more precise, a weighing conveyor 69 which is relatively long and large in a right-left direction (a right-left direction in FIG. 1) is disposed on the base plate 67, and a downstream conveyor 71 which is shorter than this weighing conveyor 69 is disposed on a downstream side (on the right side in FIG. 1) of the weighing conveyor 69. Moreover, a cutting device 73 for cutting the food dough to be transferred from the weighing conveyor 69 onto the downstream conveyor 71 is disposed between the weighing conveyor 69 and the downstream conveyor 71.

The weighing conveyor 69 has a function to measure a total weight of the relatively long and large food dough LM placed substantially across the entire length on the weighing conveyor 69, and an appropriate measurement sensor 77 such as a strain gauge is provided between a base frame 74 and a conveyor frame 75 of the weighing conveyor 69. Moreover, a roller frame 83 rotatably supporting right and left rollers 81 (see FIG. 3 where only one of the rollers is shown) for winding an endless conveyor belt 79 having an elongated shape in the right-left direction is disposed above the conveyor frame 75.

A back side (on the left side in FIG. 3 or FIG. 9) of the roller frame 83 is turnably fitted to the conveyor frame 75 via a hinge (not shown) while a front side (on the right side in FIG. 3 or FIG. 9) of this roller frame 83 is fixed to the conveyor frame 75 by use of appropriate locking means 85 such as a lock member. Therefore, by releasing fixation by the locking means 85, the roller frame 83 can be tilted so as to raise a right side portion as illustrated in FIG. 9.

Accordingly, by releasing fixation by the locking means 85 and loosening tension of the conveyor belt 79 given by the rollers 81, it is possible to detach the conveyor belt 79 forward (obliquely above on the right side in FIG. 9) from the roller frame 83, and thereby to clean the conveyor belt 79 or to replace the conveyor belt 79 with a new one. That is, it is possible to keep the conveyor belt 79 clean at any time. Note that the weighing conveyor 69 is configured to be rotated and driven by a conveyor motor 87 (see FIG. 1) which is attached to the base frame 74.

The downstream conveyor 71 is disposed above a conveyor frame 89 (see FIG. 2) which is fitted onto the base plate 67. As similar to the conveyor belt 79 provided on the weighing conveyor 69, a conveyor belt 93 provided on the downstream conveyor 71 can be detached by releasing fixation by locking means 91 which is similar to the locking means 85. Here, a configuration to detach the conveyor belt 93 from the downstream conveyor 71 is similar to the above-described configuration of the weighing conveyor 69. Accordingly, detailed description of the configuration to detach the conveyor belt 93 from the downstream conveyor 71 will be omitted.

Therefore, it is also possible to keep the downstream conveyor 71 clean at any time as similar to the weighing conveyor 69. Moreover, the downstream conveyor 71 is configured to be rotated and driven by a conveyor motor 97 which is attached to a bracket 95 fitted to the conveyor frame 89.

The cutting device 73 includes a dough holding member 99 which is capable of freely holding one side of the long and large food dough LM placed on the weighing conveyor 69 and on the downstream conveyor 71 by moving in a direction (a vertical direction in FIG. 1) to approach and recede from the long and large food dough LM. To be more precise, the dough holding member 99 is a plate which is vertically movable between the weighing conveyor 69 and the downstream conveyor 71 and has a function to touch and support the food dough LM from below as the dough holding member 99 is lifted up by an actuator 101 for vertical motion such as an air cylinder.

The cutting device 73 includes a cutting blade 103 which is opposed to the dough holding member 99 and configured to cut the food dough LM. This cutting blade 103 is configured to descend until abutting on the dough holding member 99 and to cut the food dough LM when the cutting blade 103 descends by the action of an actuator 105 for vertical motion such as an air cylinder placed in a position above the cutting blade 103.

Specifically, the dough holding member 99 opposed to the cutting blade 103 supports the food dough LM when the food dough LM is cut out with the cutting blade 103. Accordingly, a cut surface of the food dough LM can be prevented from dropping downward at the time of cutting with the cutting blade 103. Moreover, the weight of the small food dough M can be maintained accurately to cut out the small food dough M.

By this configuration, it is possible to cut the food dough LM reliably between the weighing conveyor 69 and the downstream conveyor 71. Here, the cutting blade 103 does not interfere with the weighing conveyor 69 or the downstream conveyor 71, and therefore does not damage the respective conveyor belts 79 and 93.

The above description has explained the case where the dough holding member 99 and the cutting blade 103 face each other vertically. However, these constituents may face each other upside down or in the horizontal direction.

A supply shutter 107, which temporarily receives the small food dough M dropping from the downstream conveyor 71 and drops and supplies the food dough M to the supply receiving portion 43 on the transfer path 31 of the food rounding apparatus 1, is provided on a downstream end side of the downstream conveyor 71 so as to be vertically invertible. This supply shutter 107 includes a vertical pair of gutter members 107A and 107B which contain the food dough M, and which are opened vertically. When one of the gutter members 107A (or 107B) is located above, the other gutter member 107B (or 107A) is located below.

Here, the gutter members 107A and 107B of the supply shutter 107 are provided on a bracket being arranged vertically on the base plate 67 and are vertically invertible as well as detachable. The gutter members 107A and 107B are configured to drop the food dough M from a hole provided in this base plate 67 down to the food dough rounding device 1. Then, the gutter members 107A and 107B are vertically inverted by a shutter motor 109 which is provided on the bracket arranged vertically on the base plate 67. When the upper gutter member 107A (or 107B) is in a state of receiving the food dough M and when the rotating body 21 of the food dough rounding device 1 is negatively rotated and stopped after the positive rotation, this supply shutter 107 is vertically inverted and performs an action to drop and supply the food dough M into the transfer path 31 of the food dough rounding device 1, in order to prevent the food dough M located inside the transfer path 31 from touching the food dough M to be dropped and supplied subsequently.

In order to place the large and long food dough LM on the weighing conveyor 69, a cutter frame 111 having a U-shaped cross section is provided on the base plate 67 as shown in FIG. 3. A cutter housing 117 rotatably provided with a pair of cutters 115 having a crisscross sectional shape is detachably provided on a pair of right and left support bars 113 provided above this cutter frame 111 so as to protrude horizontally forward (in the right direction in FIG. 3). Moreover, a cutter motor 119 for rotating the cutters 115 is attached to the cutter frame 111.

In order to rotate the cutters 115 with the cutter motor 119, a driving gear 119G provided on the cutter motor 119 and a driven gear 115G provided so as to interlock with the cutters 115 are engaged with each other when the cutter housing 117 is supported by the support bars 113.

Then, in order to supply the food dough in a space between the pair of cutter 115, a hopper 121 which can contain a large amount of the food dough is detachably fitted to an upper part of the cutter housing 117. The food dough measuring and cutting apparatus 3 is covered with a cover 123 which is openable upward and located above the mount frame 7. Moreover, the hopper 121 is disposed above the cutter housing 117 so as to penetrate a vertical hole 123H formed in the cover 123.

Figure 8:
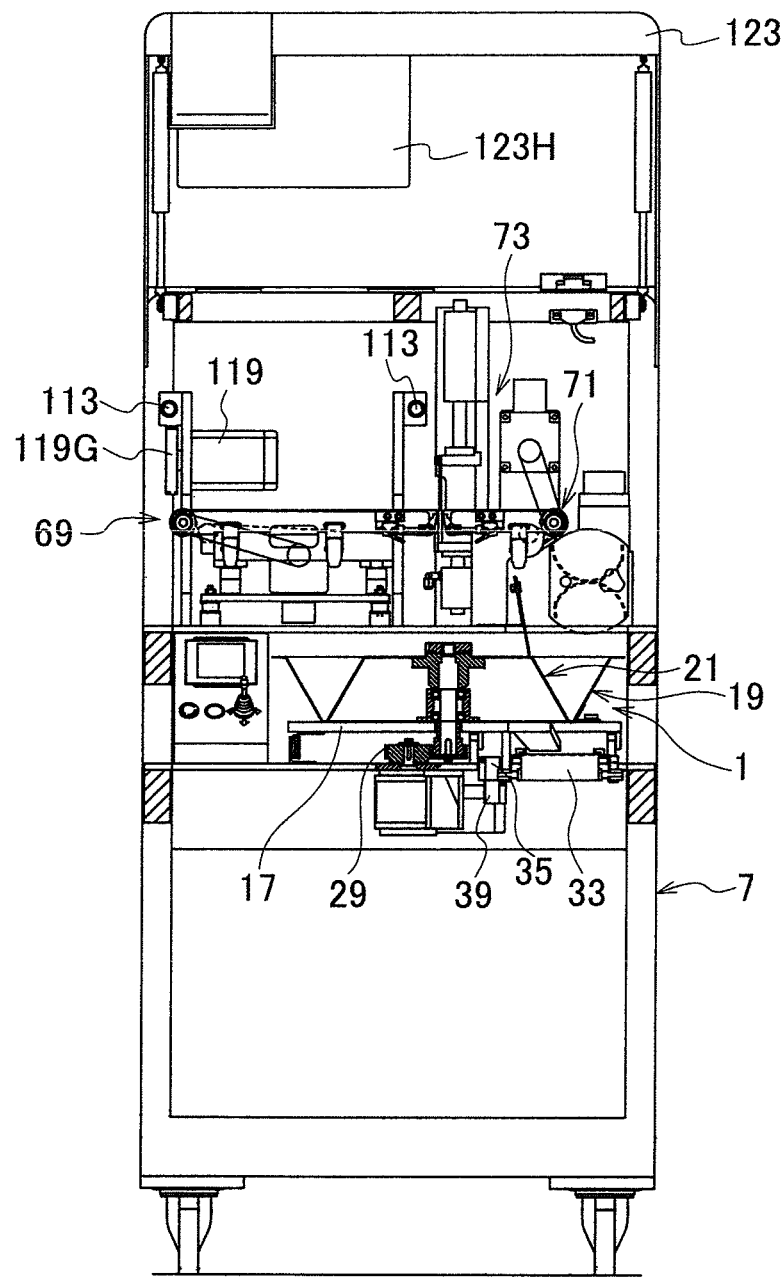
[FIG. 8]

Therefore, it is possible to open the cover 123 upward as shown in FIG. 8 and FIG. 9 after detaching the hopper 121 from the cutter housing 117. Then, by retaining the cover 123 in the state of being open upward, it is possible to detach the cutter housing 117 forward from the support bars 113 as shown in FIG. 8 and FIG. 9, and to detach the conveyor belt 79 of the weighing conveyor 69 and the conveyor belt 93 of the downstream conveyor 71 forward as described previously, thereby allowing cleaning and so forth.

In the above-described configuration, when a large amount of the food dough is put into the hopper 121, the food dough inside the hopper 121 is supplied to the space between the pair of cutters 115 due to the own weight. Therefore, when the cutter motor 119 is driven under control of a cutter control device (not shown) and the pair of cutters 115 are rotated mutually inward (so as to rotate the cutter 115 on the left side clockwise and the cutter 115 on the right side counterclockwise in FIG. 3) by a ¼ round, the relatively long and large food dough LM having the length substantially equal to the length of the cutters 115 is cut out and placed on the weighing conveyor 69.

When the long and large food dough LM is placed on the weighing conveyor 69 as described above, the total weight of the long and large food dough LM is weighed (measured) and a weighed value (a measured value) is stored in storing means (not shown) provided in the cutter control device. Then, as the long and large food dough LM is transferred from the weighing conveyor 69 onto the downstream conveyor 71 to cut out the small food dough M having the preset given weight (a set weight), the weight of the long and large food dough LM loaded on the weighing conveyor 69 is constantly measured with the weighing conveyor 69.

Thereafter, the measured value is subtracted from the weight stored in the storing means by use of computing means (not shown). When the subtracted value here becomes equal to an instructed value (a set value) inputted to the computing means to cut out the small food dough M having the preset given weight, actions of the weighing conveyor 69 and the downstream conveyor 71 are stopped. Thus, the small food dough M is cut out of and separated from the long and large food dough LM by the cutting device 73. As the small food dough M is cut out and separated as described above, the small food dough M is rapidly transferred by the downstream conveyor 71 under control of the cutter control device and is then dropped and supplied to one of the gutter members 107A of the supply shutter 107.

As the small food dough M is cut out and separated as described above, the weight of the food dough LM stored in the storing means is updated with the weight of the food remaining on the weighing conveyor 69 as the new weight of the food dough LM. Thereafter, the above-described operations are repeated, whereby the small food dough M having the preset given weight will be repeatedly cut out of the long and large food dough LM.

For example, if the subtracted value (a result of computation by the computing means), which is obtained by measuring the weight of the remaining food dough that remains on the weighing conveyor 69 after the cutting out and separation of the small food dough M and then subtracting the weight of this remaining food dough from the total weight (the stored value) of the long and large food dough LM, is equal to the given weight, the small food dough M proves that the set value (i.e., the instructed value for the computing means) set in advance is an appropriate value.

On the other hand, if the subtracted value is not equal to the given weight, there is an error in comparison of the given weight with the weight (the subtracted value) of the small food dough M being cut out. Accordingly, the instructed value (the set value) to be inputted to the computing means is corrected so as to reduce this error to cut out the small food dough M having the preset given weight. Specifically, feedback control is conducted in such a way that measurement is performed while the long and large food dough LM is transferred from the weighing conveyor 69 onto the downstream conveyor 71, and stop timing to stop the transfer is set earlier than a previous operation if the weight of the small food dough M is larger than the given weight, while the stop timing to stop the transfer is set later than the previous operation if the weight of the small food dough M is smaller than the given weight. In this way, the small food dough M can be accurately cut into the given weight.

Then, if the measured value of the remaining food dough by the weighing conveyor 69 becomes a slightly larger value than the given weight or a smaller value than the given weight, or if an optical sensor provided in an appropriate position detects that there is no more food dough in a predetermined position on the weighing conveyor 69 and the measured value becomes a smaller value than the given weight, the cutter motor 119 is driven again to cut out the long and large food dough LM again. Here, the timing for cutting out the long and large food dough LM can be set arbitrarily.

The small food dough M, which is cut and separated into the preset given amount (the set amount) out of the long and large food dough LM and is dropped and supplied to the one of gutter members 107A of the supply shutter 107, is vertically inverted at the time of a stop when the rotating body 21 of the food dough rounding device 1 is changed from the negative rotation to the positive rotation and is then dropped and supplied to the transfer path 31 of the food dough rounding device 1. Thereafter, when one of the gutter members 107A is vertically inverted, the other gutter member 107B is located on the upper side and prepared to receive the small food dough M to be supplied subsequently.

As it has been already understood, the food dough measuring and cutting apparatus 3 is configured to cut out the small food dough M when the total weight of the long and large food dough LM placed on the weighing conveyor 69 is measured and then the preset given weight (the set amount) is subtracted from this total amount. Accordingly, even when dusting flour, for example, adheres to the weighing conveyor 69 and the downstream conveyor 71, it is possible to cut the small food dough M precisely into the preset given weight. Meanwhile, even if there is the precedent small food dough M on the downstream conveyor 71, it is possible to cut the next small food dough M into the preset given weight. Hence it is possible to efficiently cut out the small food dough M having the present given weight and thereby to improve productivity.

It is to be noted that the entire contents of Japanese Patent Application No. 2008-135727 (filed on May 23, 2008) and Japanese Patent Application No. 2008-135724 (filed on May 23, 2008) are incorporated in this specification by reference.

The present invention is not limited only to the above-described embodiment of the invention and can be embodied in various other aspects by making appropriate modifications.

The invention claimed is:

1. A food dough measuring and cutting apparatus configured to cut long and large food dough into small food dough having a preset weight, comprising:
   a weighing conveyor configured to load the long and large food dough thereon and measure a weight of the loaded long and large food dough which is cut and separated from a large amount of food dough located in a hopper;
   a downstream conveyor provided on a downstream side of the weighing conveyor and configured to support a part of the long and large food dough transferred from the weighing conveyor which corresponds to the small food dough having the preset weight and which will be cut from the long and large food dough when the weighing conveyor measures the weight of the long and large food dough loaded on the weighing conveyor;
   a cutter that cuts and separates the long and large food dough into the small food dough, the cutter provided between the weighing conveyor and the downstream conveyor; and
   a controller configured to control that the weight of the long and large food dough loaded on the weighing conveyor is constantly measured by the weighing conveyor while the long and large food dough is transferred in a direction from the weighing conveyor to the downstream conveyor and while the part of the long and large food dough corresponding to the small food dough having the preset weight is transferred from the weighing conveyor onto the downstream conveyor, the small food dough having the preset weight, and the controller configured to control an operation of the cutter so that the long and large food dough is cut when the measured weight of the long and large food dough previously measured by the weighing conveyor is reduced according to the transferring of the long and large food dough toward the downstream conveyor by the preset weight of the small food dough to be cut from the long and large food dough, wherein
   the controller is configured to continuously control that the weight of the long and large food dough is updated as a new weight of the long and large food dough after the small food dough having the preset given weight was cut at the previously cutting operation, thereby repeating the transferring and measuring and cutting operations,
   the hopper is provided in a position above the weighing conveyor and configured to contain the large amount of food dough, and
   the food dough measuring and cutting apparatus further comprises: a cutter device provided in a position between the hopper and the weighing conveyor and configured to cut food dough supplied from the hopper into the long and large food dough that is to be loaded on the weighing conveyor.

2. The food dough measuring and cutting apparatus according to claim 1, wherein
   the cutter comprises:
   a dough holder configured to hold one side portion of the long and large food dough between the weighing conveyor and the downstream conveyor; and a cutting blade opposed to the dough holder and configured to cut the long and large food dough in a manner such that the cutting blade descends until abutting on the dough holder.

3. The food dough measuring and cutting apparatus according to claim 1, further comprising:
a food dough rounder provided on a lower side of a mount frame supporting the food dough measuring and cutting apparatus and configured to round the cut small food dough with the preset weight.

* * * * *